United States Patent [19]

Wight, Jr.

[11] 4,233,470
[45] Nov. 11, 1980

[54] RESTORATIVE MATERIAL FOR ANTIOXIDANT DEPLETED POLYOLEFIN INSULATION

[75] Inventor: Frederick R. Wight, Jr., West Millington, N.J.

[73] Assignee: Bell Telephone Laboratories, Incorporated, Murray Hill, N.J.

[21] Appl. No.: 55,277

[22] Filed: Jul. 6, 1979

[51] Int. Cl.³ .............................................. H01B 7/28
[52] U.S. Cl. ...................... 174/120 C; 174/110 SR; 174/110 PM; 252/63.7; 252/403; 427/117; 427/421; 427/434.6
[58] Field of Search ................ 174/110 PM, 110 SR, 174/110 B, 110 J, 137 A, 120 C; 427/117, 120, 421, 434 D, 62; 260/45.85 B, 45.9 NC, 45.9 R; 252/403, 63.7

[56] References Cited

U.S. PATENT DOCUMENTS

| | | | |
|---|---|---|---|
| 3,819,410 | 6/1974 | Kuckro et al. | 174/110 PM X |
| 3,951,911 | 4/1976 | Kiss | 260/45.85 B |
| 3,972,927 | 8/1976 | Susi et al. | 260/45.9 NC X |
| 4,093,774 | 6/1978 | Hartless et al. | 174/110 PM X |
| 4,101,512 | 7/1978 | Schmidt et al. | 260/45.95 C |
| 4,133,936 | 1/1979 | Vostovick | 174/110 PM X |

*Primary Examiner*—Ronald H. Smith
*Assistant Examiner*—Thurman K. Page
*Attorney, Agent, or Firm*—Peter V. D. Wilde

[57] ABSTRACT

Materials and methods are shown for increasing the antioxidant protection of polyolefin insulation, such as low density polyethylene insulation on electrical conductors. The materials may be applied in the field to increase the service life of in-place cable. The material is typically applied by brushing or spraying a lacquer-based carrier containing the inventive stabilizer onto the insulation to be protected. The stabilizer migrates into the polyolefin insulation, typically increasing the service life of antioxidant depleted cable by several years.

8 Claims, No Drawings

RESTORATIVE MATERIAL FOR ANTIOXIDANT DEPLETED POLYOLEFIN INSULATION

BACKGROUND OF THE INVENTION

1. Field of the Invention

This invention relates to methods and materials for increasing the antioxidant protection of polyolefin insulation on electrical conductors, such as telephone cables and electric power cables.

2. Description of the Prior Art

To protect polyethylene, polypropylene, or other types of polyolefin insulation on electrical cables from deterioration, it is known in the plastics industry to add antioxidant material to the polyolefin resin during manufacture of the resin. The antioxidant helps prevent deterioration of the polyolefin during high-temperature extrusion of the insulation onto the wire conductor during manufacture of the cable. The antioxidant also helps prevent cracking and peeling of the insulation, and other ill effects, during the service life of the cable. Such deterioration can occur due to long exposure to the atmosphere, particularly at elevated temperatures of 40 degrees C. and above. The most commonly used antioxidant materials include phenolic type antioxidants, which are often combined with a peroxide decomposer (a so-called "synergist"). The antioxidant and the synergist each typically comprise 0.1% by weight of the insulation.

In more recent years, it has been discovered that the copper conductor in many cables has a catalytic effect that promotes the depletion of the antioxidant. To counter this effect, copper deactivators are now also frequently added to the polyolefin resin during manufacture. Also, the color pigments in many cables have a catalytic effect that promotes deterioration of the insulation.

For these and possibly other reasons, the net effect is that many cables, particularly those manufactured before corrective action for the foregoing debilitating effects was initiated, have deteriorated in service due to depletion of the antioxidant at a faster rate than originally anticipated. For example, it has been found that some multi-conductor telephone cables installed up to 1971 in the southern states have shown signs of deterioration earlier than originally anticipated, particularly in above-ground pedestal-type terminating boxes where the temperature often reaches 40 degrees C. The insulation may become so cracked and brittle that replacement of a portion of the cable, or even the entire cable, is required, which is an expensive solution both in terms of labor and materials.

One attempt to correct this problem for cables already in service in the field has been the formulation of a coating material consisting of an antioxidant in a lacquer-based carrier. The antioxidant comprised about 0.5% by weight of the dried coating, and was intended to migrate into the antioxidant depleted insulation, to restore the original antioxidant level. The antioxidant used was 4, 4' thiobis-(6-tertiary-butyl-meta-cresol), otherwise known by the trade name "Santonox R." This was the same antioxidant material originally introduced into the insulation during manufacture at a level of about 0.1%. However, subsequent tests showed that the actual amount of antioxidant migrating into the insulation was much less than the 0.1% originally present, and furthermore, that this particular antioxidant was rapidly depleted so that little additional protection was obtained.

Clearly, what is needed is a coating formulation that can be applied in the field to partially or totally antioxidant depleted cable, that provides a significant increase in service life.

SUMMARY OF THE INVENTION

I have invented a new antioxidant restoration method for increasing the antioxidant protection in polyolefin material such as polyethylene, polypropylene, or polybutene insulation. The method uses a stabilizer system that includes both an antioxidant species that migrates relatively rapidly into the insulation, and an antioxidant species that migrates relatively slowly into the insulation. In addition, the stabilizer system includes a peroxide decomposer. In a preferred embodiment, the inventive stabilizer system is combined with a lacquer carrier which is applied directly to the insulation, as by brushing or spraying.

DETAILED DESCRIPTION

The following description relates to a protective material and application methods for increasing the antioxidant levels in polyolefin insulation. These include polyethylene, polypropylene, or polybutene insulation on wire cables, such as telephone cables and electrical power cables.

In a preferred embodiment, the material comprises a stabilizer system and a lacquer carrier which further comprises a reservoir material and a solvent material. The inventive stabilizer system comprises a rapidly migrating antioxidant, a slowly migrating antioxidant, and a peroxide decomposer. After application to polyolefin insulation, hereafter also referred to simply as the "insulation," the solvent portion of the carrier evaporates, leaving the reservoir material and the stabilizer system coating onto the insulation.

In another embodiment, the inventive stabilizer system is incorporated into a pre-polymer material that is pumped into a cable, filling spaces between insulated conductors. In still another embodiment, the inventive stabilizer is simply placed inside an enclosed space containing insulated wires, and the stabilizer diffuses through the air onto the insulation, and then migrates into the insulation.

As used herein, the term "antioxidant" refers to a free-radical chain-stopping material, and the term "syngerist" means a peroxide decomposer. The function of these materials can be understood with reference to the polyolefin polymer degradation process, which proceeds via the production of free radicals. For this purpose, RH represents a chain molecule of the polyolefin polymer, and R· represents the radical formed by removing an H· radical from the molecule. The antioxidant is represented by AOH, and combines with the polyolefin radical as follows: $R\cdot + AOH \rightarrow RH + AO\cdot$, thus obtaining again the RH chain molecule, and eliminating the R· radical. The AO· antioxidant radical also formed is very unreactive with the RH molecule and with other possible radical sources generally. Therefore, the number of reactive free radicals is reduced by the action of the antioxidant. However, $RO_2H$ molecules can also be produced in the degradation process. These tend to be thermally unstable due to the relatively weak O—O bond, and can also produce free radicals. The peroxide decomposer is represented by S, and combines as follows: $RO_2H + S \rightarrow ROH + SO$. This reaction proceeds along an ionic path, and eliminates the peroxide as a source of free radicals. Thus, the amount of reactive free radicals is reduced by the addition of antioxidant and peroxide decomposer material to the polyolefin. Since the reactive free radicals are a source of polyolefin degradation, the reduction of free radicals retards the degradation process. For further information regarding the degradation process, see for example, Encyclopedia of Polymer Science and Technology, Vol. 4, pp. 699–702 (1966).

The lacquer carrier used for the tests given below of the preferred embodiment has a composition as given in Table I.

TABLE I
COMPOSITION OF LACQUER COATING

| Ingredient | Parts by Weight |
|---|---|
| Aliphatic Urethane | 8 |
| Isopropyl Alcohol | 56 |
| 1,1,1-Trichloroethane | 36 |

The aliphatic urethane remains coated onto the article after the solvents have evaporated, and serves as the reservoir material. Suitable aliphatic urethanes include the reaction products of certain diisocyanates and linear diols. Useful diisocyanates include hexamethylene diisocyanate, isophorone diisocyanate, and methylene-bis-cyclohexyl-diisocyanate. Suitable diols include polyoxypropylene glycol and polyoxyethylene glycol, having molecular weights in the range of 1000 to 3000. The aliphatic urethanes so formed have good long-term thermal stability, remaining soft and flexible at elevated temperatures for extended periods of time.

The solvent material preferably consists of alcohols and non-aromatic hydrocarbons, including substituted non-aromatic hydrocarbons. These materials are preferred to avoid deleterious effects on connectors or other components made of polycarbonate plastic, such as LEXAN ® plastic. In addition, at least in the case of low density polyethylene insulation, the solvent material need not significantly swell the insulation, which may be important in maintaining the integrity of the insulation. This is a departure from earlier teachings on restorative coatings, which held that swelling was necessary to aid the migration of the antioxidant from the coating into the insulation. In particular, alcohols do not significantly swell the polyolefins, so that an alcohol may now comprise a large percentage, or even all, of the solvent.

The composition given in Table I is suitable for brush-coating onto the insulation. A composition having approximately 6 weight percent aliphatic urethane, with the proportion of the other components remaining the same, is more suitable for spraying onto insulation, as from a pressurized container.

The tests used in screening the antioxidant and synergist materials include differential thermal analysis, and oxygen uptake testing. A brief description of these tests is given in U.S. Pat. No. 3,868,221, assigned to the same assignee as the present invention, with the references cited therein giving a more complete description. Additives tested are summarized in Table II. The concentrations used herein are all based on the percent by weight of stabilizer in the solid coating after drying.

Test Sample Preparation Procedure

Initial tests were performed on low density polyethylene (LDPE) films 0.015" (0.04 mm) thick, which initially contained no stabilizer. As used herein, the term "low density polyethylene," also known as Type I polyethylene, means polyethylene having a specific gravity in the range of 0.910 to 0.925 gms/cm$^3$. However, other polyolefin films would be prepared and tested in a similar manner. For initial screening of phenolic antioxidants a series of lacquer coating solutions were prepared containing one percent primary phenolic antioxidant based on the weight of solids. The films were dipped in the coating solutions and hung to dry. Two coats were applied. Coating thicknesses were typically 0.002" (0.05 mm). The films in the solution were then placed in a forced air oven, and aged at a given temperature for specified periods of time. After aging, the lacquer coatings were removed, which completed the test sample preparation procedure.

After sample preparation, testing was accomplished using differential thermal analysis (DTA). The DTA oxygen induction times (OIT) obtained are used as a measure of the amount of antioxidant migrating into the polyethylene. Unstabilized LDPE gives an induction period of 1 minute at 160 degrees C. The induction period will increase with increasing stabilizer concentration. Higher test temperatures are used to obtain results in a relatively short time period. Results of the preliminary evaluation of phenolic antioxidants are shown in Table III for a 90 degree C. aging temperature. Comparable results were obtained when LDPE insulated 22 AWG copper wire was prepared and tested in the same manner.

TABLE II
ADDITIVES EVALUATED IN COATING
HINDERED PHENOLS

| Chemical Name | Molecular Formula | Trade Name/Supplier |
|---|---|---|
| Tris (3,5-di-tert-butyl-4-hydroxyphenyl) tricarbonamide | $C_{45}H_{63}O_6N_3$ | Goodrite 3114/B. F. Goodrich |
| Tetrakis [methylene 3-(3',5'-di-t-butyl-4'-hydroxyphenyl) propionate] methane | $C_{73}H_{108}O_{12}$ | Irganox 1010/Ciba Geigy Corporation |
| 1,2 di[3-(3,5-di-tert-butyl-4-hydroxy-phenol) propionyl] hydrazine | $C_{34}H_{52}O_4N_2$ | Irganox 1024/Ciba Geigy Corporation |
| Thio-diethyl-bis (3,5-di-tert-butyl-4-hydroxy hydrocinnamate) | $C_{38}H_{58}O_6S$ | Irganox 1035/Ciba Geigy Corporation |
| Octadecyl 3-(3',5'-di-tert-butyl-4'-hydroxyphenyl) propionate | $C_{35}H_{62}O_3$ | Irganox 1076/Ciba Geigy Corporation |
| 4,4'thiobis-(6-tertiary butyl | $C_{22}H_{30}O_2S$ | Santonox R/Monsanto Corporation |

TABLE II-continued
ADDITIVES EVALUATED IN COATING

| meta cresol) 3:1 condensate of 3 methyl, 6 tertiary butyyl-phenol with crotonaldehyde | $C_{37}H_{52}O_3$ | Topanol Ca/ICI Corporation ICI Corporation |
|---|---|---|

SYNERGISTS

| Chemical Name | Molecular Formula | Trade Name/Supplier |
|---|---|---|
| Dilauryl thiodipropionate | $C_{30}H_{58}O_4S$ (Thioester) | DLTDP/Uniroyal Inc. |
| Distearylthiodipropionate | $C_{42}H_{82}O_4S$ (Thioester) | DSTDP/Uniroyal Inc. |
| Pentaerythritol hexyl thiodipropionate | $C_{53}H_{92}O_{16}S_4$ (Thioester) | MK 2140/Argus Chemical Corp. |
| Tetrakis (nonylphenyl) polypropyleneglycol 425 diphosphite | $C_{81}H_{134}O_{11}P_2$ (Phosphite) | Weston 425P/Borg-Warner Chemicals |

TABLE III
ANTIOXIDANT MIGRATION AT 90° C. IN COATED UNSTABILIZED LDPE

| Antioxidant in Lacquer (1%) | DTA Test Temperature (°C.) | Induction Time (Min) After Days Aging at 90° C. | | | | | |
|---|---|---|---|---|---|---|---|
| | | 1 Day | 3 Days | 10 Days | 42 Days | 100 Days | 200 Days* |
| Santonox R | 180° | 8 | 11 | 7 | 5 | 2 | 1 |
| Irganox 1010 | 180° | 30 | 32 | 27 | 14 | 12 | 1 |
| Irganox 1035 | 190° | 28 | 23 | 5 | 9 | 6 | 1 |
| Irganox 1024 | 180° | 10 | 10 | 8 | 9 | 4 | 3 |
| Topanol CA | 180° | 10 | 8 | 5 | 7 | 2 | 2 |
| Goodrite 3114 | 190° | 10 | 12 | 12 | 14 | 11 | 8 |
| Santonox R (0.5%) | 180° | 3 | 4 | 3 | — | — | — |
| Untreated Control | 160° | 1 | Embrittled in 55 days | | | | |

*All readings after 200 days taken at 180° C.

Note that all DTA measurements were made at 180 degrees C. except for Irganox 1035 and Goodrite 3114 which were made at 190 degrees C because of their higher induction periods. An increase in DTA test temperature of 10 degrees C results in about a one-half reduction in oxygen induction time, so that if the Irganox 1035 and Goodrite 3114 has been tested at 180 degrees C., their OIT's would be about twice as long as shown. Upon aging 3 days or less the induction periods for all samples have reached their maxima and decrease gradually from that point onward except for the Goodrite 3114, which has been retained the best in the polyethylene for periods exceeding about 42 days.

These results are surprising, as one would expect the degree of migration, as measured by the OIT's, to continually increase for longer aging times, or at least to not decrease past a given time. This shows that an antioxidant chosen for good short-term performance may not provide the optimum long-term performance, and vice-versa.

Table IV shows the effect of similar treatment when aged at 70 degrees C. and 45 degrees C.

and gives high induction periods over a longer aging time. This suggests a method of achieving protection that has never been used for protective antioxidant coatings: combining a material having good short-term performance with a material that does not necessarily have good initial performance, but has better long-term performance than the first material. This would be more effective than merely adding more of the short-term stabilizer, for achieving protection over long periods of time.

However, since 45 degrees C. is closest to what is found in the field it can be seen that the level of stability that can be imparted to LDPE by this method alone does not appear significant. It is unlikely that an extension of field life by say, twenty years, could be achieved.

To further improve the stability imparted by phenolic antioxidants a series of stabilizer packages were made up, which included synergistic components in conjunction with Irganox 1035. Irganox 1035 was used as the primary antioxidant because of its outstanding initial performance. However, as seen from Table III, Goodrite 3114 would also be a good choice in view of its

TABLE IV
ANTIOXIDANT MIGRATION AT 70° C. AND 45° C. INTO COATED UNSTABILIZED LDPE

| Antioxidant in Lacquer (1%) | DTA Test Temperature (°C.) | OIT (Min) After Days at 70° C. | | | Temperature | OIT (Min) After Days at 45° C. | | |
|---|---|---|---|---|---|---|---|---|
| | | 1 Day | 5 Days | 20 Days | | 2 Days | 10 Days | 20 Days |
| Santonox R | 180 | 3 | 2 | 2 | 170 | 2 | 2 | 2 |
| 1010 | 180 | 5 | 7 | 6 | 170 | 3 | 6 | 4 |
| 1035 | 180 | 22 | 17 | 17 | 180 | 3 | 4 | 3 |
| 3114 | 180 | 15 | 15 | 21 | 180 | 1 | 1 | 2 |

Clearly at the lower temperatures far less antioxidant is migrating into the LDPE. At 70 degrees C., however, the trend among stabilizers is the same. That is, Irganox 1035 and Goodrite 3114 look better than the others. Note again that 3114 appears to migrate more slowly superior long-term retention. These packages were added to the lacquer at a level of one percent each by weight of solids. LDPE films were coated and aged at 70 degrees C. Results are shown in Table V.

TABLE V

SYNERGIST MIGRATION AT 70 DEGREES C. INTO COATED UNSTABILIZED LDPE

| Antioxidant/Synergist in Lacquer 1% Each | OIT (min) at 180 degrees C. After Days at 70 degrees C. | |
|---|---|---|
| | 1 Day | 5 Days |
| 1035/DSTDP | 20 | 21 |
| 1035/425P | 45 | 43 |
| 1024/DSTDP | 18 | 16 |
| 1035/DLTDP | 36 | 31 |
| 1035 | 22 | 17 |

Note that Weston 425P phosphite and DLTDP synergists gave significant improvements over 1035 alone. Since phosphite synergists are susceptable to hydrolysis, DLTDP is the preferred choice.

Table VI shows the effect of stabilizer concentration on its degree of migration into LDPE at 45 degrees C. The concentrations indicated here are based on a percentage of the solids in the lacquer.

TABLE VI

ANTIOXIDANT ABSORPTION AT 45° C. INTO UNSTABILIZED LDPE

| Concentration of Stabilizers 1035 and 425P | OIT (Min) at 190° C. After Days at 45° C. | | |
|---|---|---|---|
| | 1 Day | 7 Days | 14 Days |
| 1% each | 3 | 8 | 5 |
| 3% each | 17 | 52 | 50 |
| 5% each | | 85 | 80 |
| 5% 1035; 5% DLTDP | | 43 | 44 |
| 5% 1076; 5% DLTDP | | 91 | 76 |
| 5% 1076; 5% MK 2140 | | 87 | 89 |
| 2.5% 1076; 2.5% 3114; 5% MK 2140 | | 77 | |
| 0.5% Santonox R | | 1@180° C. | 1@180° C. |

Clearly the higher concentrations show an improvement in the quantity of stabilizer diffusing into the polymer. Also shown in Table VI is that Irganox 1076 used in conjunction with synergists DLTDP or MK 2140 is very effective. MK 2140 is a liquid thioester synergist, and is preferably used because of the tendency of DLTDP to precipitate out of the lacquer solution before completely drying. Additionally, the lacquer which contains 0.5% Santonox was also tested. This formulation shows only minimal improvement in induction time compared to the other formulations shown.

Attempts were made to improve the rate and degree of migration by introducing various solvents and oils that might act as carriers by swelling the LDPE. However, addition of toluene, xylene, or low viscosity mineral oils were found to produce no measurable improvement at 45 degrees C.

To ascertain some measure of the expected lifetime of the samples of Table VI with 5 percent each of a hindered phenol and a synergist, oxygen uptake tests were run at 100 degrees C. on a 22 AWG wire sample insulated with unstabilized LDPE. The samples were coated with the restorative coating and aged for one week at 45 degrees C. The coating was then removed by softening in isopropyl alcohol before running the oxygen uptake. This latter step was necessary since as was seen earlier an abnormally high amount of stabilizer diffuses from the coating into the LDPE at these higher temperatures.

Table VII shows the results of the 100 degrees C. oxygen uptake test.

TABLE VII

100 DEGREES C. OXYGEN UPTAKE ON TREATED 22 AWG

| Stabilizer In Coating (5% Each) | Time to First Cracking | |
|---|---|---|
| | Days | (Years) |
| Irganox 1035/425P | 90 | 0.25 |
| Irganox 1076/DLDTP | 106 | 0.27 |
| Irganox 1076/MK 2140 | 117 | 0.32 |
| Unstabilized LDPE | 3 | 0.008 |
| LDPE/0.1% Santonox | 11 | 0.030 |

This shows a remarkable improvement in stability can be achieved by this method. Comparison with a master calibration curve (not shown) shows that 90 days at 100 degrees C. translates to approximately 15 years at the worst case temperature of 40 degrees C. In most parts of the country where cracking is minimal an extension of several years in life appears readily achievable.

A preferred stabilizer material, based on the foregoing data and analysis, comprises a relatively rapidly migrating antioxidant for short-term protection of the insulation, a more slowly migrating antioxidant for longer term protection, and a synergist. The preferred short-term antioxidants in increasing order of preference are: Irganox 1010, Irganox 1035, and Irganox 1076. The preferred long-term antioxidant is Goodrite 3114, and the preferred synergists in increasing order of preference are: Weston 425P, DLTDP, and MK 2140. A preferred stabilizer material for brushing or spraying directly onto polyolefin insulation would thus include approximately 2.5 weight percent octadecyl 3-(3',5'-di-tert-butyl-4'-hydroxyphenyl) propionate and approximately 2.5 weight percent tris(3,5-di-tert-butyl-4-hydroxyphenyl)tricarbonamide and approximately 5 weight percent pentaerythritol hexyl thiodipropionate, with the foregoing percentages based upon the amount of reservoir material. This stabilizer would be combined with the lacquer coating described in Table I and following. For number 26 gauge wire having an insulation thickness of approximately 7 to 8 mils (approximately 0.2 millimeters), the dried coating thickness should be at least 0.1 mils (0.0025 millimeters) and typically about 0.5 mils (0.0127 millimeters). For other insulation thicknesses, the volume of dried coating would scale approximately proportionally to the volume of insulation.

It should be noted that more than two antioxidants can be used. For example, an antioxidant having a "medium" rate of migration can be added to those having shorter and longer migration times. To some extent, the migration rates can be determined on the basis of the physical properties of the material. Generally, it is known that non-polar or low polarity molecules migrate more rapidly in the polyolefins than more polar molecules. A high oxygen content along with the presence of nitrogen indicates a more polar molecule. In addition, the lower molecular weight molecules migrate more rapidly than higher molecular weight molecules of comparable polarization. As seen from the molecular formulas in Table II, this explains why Irganox 1010 migrates less rapidly than Irganox 1035, and also why Goodrite 3114, with its more polarized molecule, migrates least rapidly of all. It also shows that Irganox 1076 migrates relatively rapidly compared to most of the others.

Although the foregoing tests were conducted on low density polyethylene, tests have also been conducted on high density (also called Type III) polyethylene having a density in the range of 0.941 to 0.959 gms/cm$^3$. As seen in Table VIII, the migration patterns are comparable to those shown in Table II, except that the OIT values are somewhat less, indicating less total migration in each case. In addition, the chemical similarity of the other polyolefins, such as polypropylene and polybutene (also known as polybutylene), shows that the inventive stabilizer will increase their antioxidant protection as well.

TABLE VIII

ANTIOXIDANT MIGRATION AT 90 DEGREES C. IN COATED HIGH DENSITY POLYETHYLENE

| Antioxidant in Lacquer at 1% | DTA Test Temp | OIT (min) After 90 Degrees C. Aging for: | | |
|---|---|---|---|---|
| | | 3 Days | 10 Days | 20 Days |
| Santonox R | 180 degrees | 6 | 4 | 2 |
| 1010 | 180 degrees | 19 | 16 | 9 |
| 1035 | 180 degrees | 22 | 20 | 20 |
| 1024 | 180 degrees | 4 | 3 | 3 |
| Topanol CA | 180 degrees | 4 | 3 | 3 |
| 3114 | 180 degrees | 14 | 20 | 30 |

Although the preferred method of applying the inventive material is by means of the lacquer carrier used in the above tests, applied either by brushing or spraying on the insulation to be protected, other means are possible. For example, a pre-polymer material has been developed that can be pumped into a cable, which polymerizes inside the cable around the individual insulated conductors; see U.S. Pat. Nos. 3,733,426 and 3,981,947 assigned to the same assignee as the present invention. It is possible to add the inventive stabilizer to this pre-polymer material before it is pumped into the cable, with the polymerized material then serving as the reservoir material for the inventive stabilizer material. Also, for enclosed areas, it is possible to simply place the stabilizer material in the enclosure, without directly applying it to the insulation to be protected. The stabilizer will then diffuse through the air onto the insulation, and migrate in as before, although the level of protection is normally less by this method due to the limited amount of diffusion through the air. A further variation of this method is to spray the stabilizer in the lacquer carrier material onto a surface in an enclosure, with the stabilizer then migrating through the air onto the insulation to be protected. All of these methods are herein considered to be external application of the protective material, as distinguished from the method of adding the protective material to the polyolefin insulation pre-polymer during manufacture. In addition to the above stabilizer materials, an ultraviolet absorbing material may be added to the lacquer carrier for protection against solar degradation.

All such variations and deviations through which this invention has advanced the art are considered to be within the spirit and scope of this invention.

I claim:

1. A method of protecting polyolefin insulation on an electrical conductor comprising the step of externally applying a protective material to said insulation, with said protective material comprising a stabilizer material that migrates into said insulation, the method characterized in that said stabilizer material comprises a first antioxidant selected from the group consisting of: tetrakis [methylene 3-(3',5'-di-t-butyl-4'-hydroxyphenyl) propionate] methane; thio-diethyl-bis (3,5-di-tert-butyl-4-hydroxy hydrocinnamate); and octadecyl 3-(3',5'-di-tert-butyl-4'-hydroxyphenyl) propionate; and a second antioxidant consisting of: tris (3,5-di-tert-butyl-4-hydroxyphenyl) tricarbonamide; and a peroxide decomposer selected from the group consisting of: tetrakis (nonylphenyl) polypropyleneglycol 425 diphosphite, dilauryl thiodipropionate, and pentaerythritol hexyl thiodipropionate.

2. The method of claim 1 further characterized in that said protective material further comprises a reservoir material in which said stabilizer material is dispersed, and from which said stabilizer material migrates into said insulation.

3. The method of claim 2 further characterized in that said protective material further comprises a solvent material that evaporates upon application of said protective material.

4. The method of claim 3 further characterized in that said first antioxidant and said second antioxidant and said peroxide decomposer each comprise at least 1.0 percent by weight of said reservoir material.

5. The method of claim 4 further characterized in that said first antioxidant is octadecyl 3-(3',5'-di-tert-butyl-4'-hydroxyphenyl)propionate, and said peroxide decomposer is pentaerythritol hexyl thiodipropionate.

6. The method of claims 3, 4, or 5 further characterized in that said protective material is applied to said insulation by brushing or spraying said protective material directly onto said insulation.

7. The method of claim 6 further characterized in that said polyolefin is polyethylene having a specific gravity in the range of 0.910 to 0.925 gms/cm$^3$.

8. A polyolefin insulated electrical conductor protected according to the method of claim 1.

* * * * *

UNITED STATES PATENT AND TRADEMARK OFFICE
CERTIFICATE OF CORRECTION

PATENT NO. : 4,233,470
DATED : November 11, 1980
INVENTOR(S) : Frederick R. Wight, Jr.

It is certified that error appears in the above-identified patent and that said Letters Patent are hereby corrected as shown below:

Column 2, line 49, "syngerist" should be --synergist--. Column 5, line 3, "butyyl" should be --butyl--. Column 5, line 23, "5" should be --15--. Column 8, line 35, "hydroxyphenyl" should be --hydroxyphenyl)--.

Signed and Sealed this

Twelfth Day of May 1981

[SEAL]

Attest:

RENE D. TEGTMEYER

Attesting Officer    Acting Commissioner of Patents and Trademarks